Patented May 12, 1942

2,282,682

UNITED STATES PATENT OFFICE 2,282,682

ELECTROCHEMICAL HALOHYDRINATION

Miroslav Tamele, Oakland, and Lloyd B. Ryland, El Cerrito, Calif., assignors to Shell Development Company, San Francisco, Calif., a corporation of Delaware No Drawing. Application June 21, 1940, Serial No. 341,710

10 Claims. (Cl. 204—81)

The present invention relates to the preparation of halogenated organic hydroxy compounds, and more particularly to the manufacture of aliphatic and/or alicyclic halohydrins. More specifically, the invention pertains to a novel process whereby halohydrins may be effectively and economically produced from unsaturated alcohols, and preferably from unsaturated aliphatic and/or alicyclic alcohols having at least some solubility in water. In one of its more specific embodiments, the invention includes a novel process for the halohydrination of unsaturated aliphatic alcohols generally possessing an unsaturated linkage in allylic position with respect to the carbinol group. In another specific embodiment, the present invention covers an improved process of treating dilute solutions of water-soluble aliphatic and/or alicyclic unsaturated alcohols in aqueous hydrogen halide solutions to produce high yields and relatively high concentrations of the corresponding halohydrins, while inhibiting or at least greatly decreasing the formation of polyhalides.

The prior art is replete with processes relating to the production of halohydrins by the interaction of unsaturated organic compounds with hypohalous acid or with aqueous halogen-containing solutions. In all of these reactions, a halogen and a hydroxy radical are chemically added to different carbon atoms of the unsaturated compound to form the corresponding halohydrin. In all of these chemical processes for the halohydrination of unsaturated organic compounds, relatively dilute aqueous hypohalous acid solutions are formed either by the interaction of a halogen, such as chlorine, bromine, etc., with water, or by a reaction of the halogen with an aqueous solution of a strong base and a weak acid such as sodium hypohalite. It is thus seen that the halohydrination processes employed heretofore require the undesirable separate handling of free halogen. Furthermore, in the purely chemical halohydrination processes, one-half of the halogen introduced into the reaction system is wasted so far as the halohydrination step is concerned since this halogen goes to the formation of by-products, namely, hydrogen halide, sodium halide, chlorates, or the like, depending on the process employed for the manufacture of the hypohalous acid necessary for the chemical halohydrination. Also, the purely chemical processes for the halohydrination of unsaturated organic compounds do not permit the production of relatively concentrated aqueous solutions of the halohydrins.

It is one of the main objects of the present invention to avoid the above and other defects and to provide a process for the halohydrination of unsaturated aliphatic and/or alicylic alcohols wherein it is unnecessary to employ free halogen for the production of the hypohalous acid. A further object of the invention is to provide a process wherein relatively high concentrations of halohydrins may be attained readily and economically. A still further object is to provide a process wherein aqueous solutions of the cheap and readily available hydrogen halides may be employed for the halohydrination of the unsaturated aliphatic and/or alicyclic alcohols. Still other objects will be apparent from the following description of the present invention.

It has now been discovered that the above and other objects may be attained by subjecting the above-outlined and hereinbelow more fully described unsaturated alcohols to anodic halohydrination. In other words, according to the present invention, the halohydrination of the unsaturated alcohols is effected by subjecting an aqueous solution or mixture of the unsaturated alcohol or alcohols and of a hydrogen halide to the action of a direct current which is conveyed through such solution or mixture between cathodic and anodic termini or electrodes disposed or immersed in said solution.

Representative examples of unsaturated aliphatic and alicyclic alcohols which may be treated in accordance with the process of the present invention are: allyl alcohol, methyl vinyl carbinol, crotyl alcohol, allyl carbinol, methyl allyl carbinol, cyclohexene-1-ol-1, 1-hydroxy-cyclohexene-1, cyclohexene-1-ol-3, 4-hydroxy-cyclohexene - 1, 1 - acetylenyl - cyclopentanol - 1, methyl-2 methyl-cyclohexene-1 carbinol, and the like, and their homologues and analogues. It is to be noted that all of the above unsaturated alcohols are water soluble to a greater or lesser extent. Although the examples given above present compounds containing only one unsaturated linkage, it is obvious that the alcohols which may be electro-chemically halohydrinated may have a greater number of such unsaturated linkages which may be disposed in vicinal or non-vicinal and conjugated or non-conjugated relationship to each other. Also, the compounds may have either olefinic or acetylenic linkages or both, and may contain one or more carbinol radicals. It is to be further understood that the aliphatic and/or alicyclic unsaturated alcohols of the types presented hereinabove may have various alkyl, aryl and/or aralkyl substituents in place of one or more of the hydrogen atoms directly attached to the various carbon atoms of the molecule.

Broadly stated, the invention comprises a novel process of producing halogenated organic hydroxy compounds or halohydrins from unsaturated aliphatic and/or alicyclic alcohols which are preferably at least somewhat soluble in water, this process comprising or including the step of subjecting a relatively dilute aqueous solution or mixture of the alcohol and of a hydrogen halide to the action of a direct electric current which is conveyed through the solution between cathodic and anodic termini disposed in said solution. In preparing the halogenated organic hydroxy compounds according to the present invention, the net result of the interaction of the three reacting bodies, namely, the unsaturated alcohol, the hydrogen halide, and the water, under the influence of the direct electric current, is that the hydroxy radical of water and the halogen radical of the hydrogen halide are attached to the unsaturated alcohol to form the aforementioned halogenated organic hydroxy compound, this halohydrination being effected at or in the substantial vicinity of the anode. This reaction also yields free hydrogen which is evolved at the cathode and leaves the vessel or cell in the substantial vicinity of the terminus. Whether the halohydrination reaction is caused by simultaneous or successive addition of the halogen and hydroxy radicals to the unsaturated alcohol, or whether there occurs an intermediate reaction during which hypohalous acid is formed, is not believed to be important or pertinent to the present process. Any statements made in this respect would be mere postulations of various theories, most of which are not fully understood at the present time. Furthermore, not one of these theories explains all of the discovered facts discussed more fully hereinbelow.

The electrochemical halohydrination of the above-defined class of unsaturated alcohols may be effected under widely different conditions depending on the starting material, the desired halohydrin, etc. These variables will be described hereinbelow with particular reference to the effects thereof on the electrochemical chlorhydrination of allyl alcohol to produce high yields of glycerol monochlorhydrin. It is to be understood, however, that the hereinbelow described variations of the operating conditions will also affect to a greater or lesser degree the effectiveness of the electrochemical halohydrination of the other unsaturated alcohols of the defined class.

The electrolysis according to this invention may be effected in any type of cell normally employed for the electrolytic production of chlorine, such a cell being ordinarily provided with one or more cathodes and one or more anodes immersed into the liquid subjected to treatment. Such cells may be provided with diaphragms disposed between the portion of the cell containing the cathode or cathodes and that portion of the cell which contains the anodes. This diaphragm ordinarily consists of a material which permits the passage of the ions therethrough due to the effect of the electric current, while reducing or inhibiting the diffusion of the products liberated at the respective electrodes. Diaphragms may be made of various materials such as alundum, asbestos, etc., of various thicknesses depending on the material treated and degree of porosity of such porous substance. For instance, when employing asbestos this thickness may vary from about 0.01 to 0.05 inch. When effecting the electrochemical halohydrination according to the present invention, i. e. when aqueous solutions of a hydrogen halide and the unsaturated alcohol are subjected to the action of a direct current, it is unnecessary to employ any diaphragm between the cathode and anode. The effective halohydrination of the unsaturated alcohols such as allyl alcohol in simple cells, i. e. those which do not contain a diaphragm, is possible because there is appreciably no reduction of the unsaturated alcohol and/or of the resulting halohydrin at the cathodes. The elimination of the diaphragm from the cells employed for the electrochemical halohydrination is highly desirable since the cell is then considerably more conductive as compared to a cell equipped with a diaphragm. Consequently, when the halohydrination is effected in the absence of any diaphragm, less electric power is required to carry the current between the electric termini, and less current is consumed in the form of heat. Therefore, the halohydrination may be realized with greater energy efficiency.

Both the cathode and anode electrodes may be made or constructed of any electrically conductive material which is inert to the action of the reactants and reaction products. Representative materials which may be employed for the manufacture of both the cathodic and anodic electrodes include carbon, graphite, platinum, and the like. Also graphitic electrodes coated with other conductive materials, such as platinum, may be effectively employed. Although in some instances non-porous electrodes, such as graphite electrodes coated or impregnated with resins, may be employed, the use of such electrodes usually lowers the current efficiency to such an extent that the operations become impractical or uneconomical. Frequently, when employed for the electrochemical halohydrination in accordance with the process of the present invention, the electrodes become coated with water-insoluble organic matter the presence of which lowers the current efficiency of the process. This organic matter may then be removed from the electrodes by various means such as heating the electrodes to elevated temperatures, reversing the polarity at the electrodes, etc.

The cells employed for the electrochemical halohydrination of unsaturated aliphatic and/or alicyclic alcohols may contain cathodes and anodes having the same or different effective areas. In order to obtain efficient distribution of current density, it is preferred to have the surfaces of the cathodes and of the anodes facing each other. Also, it is advantageous to arrange these electrodes so that the distances between the anodes, on the one hand, and the cathodes on the other, are substantially equal. As will be shown in the examples, the surface area of the cathodes may vary since the current density on these electrodes is not important and does not affect the efficiency of the process. It is to be understood that the process may be effectively realized also by employing a cell with or without a diaphragm, this cell containing a plurality of anodes which may be arranged, for example, equi-distant from each other and from a single centrally disposed cathode. Obviously, the number of the electrodes and their arrangement within the cell may vary, and the selection of the size, shape and disposition of such electrodes will at least in part be affected by the size and type of the cell or compartment employed, the presence or absence of a diaphragm, the particular reactants subjected to the electric current, their concentration in the aqueous solution, and other conditions.

The concentration of the hydrogen halide in the aqueous solution employed for the electrochemical halohydrination of the defined class of unsaturated alcohols may vary within relatively wide limits. For instance, in the chlorhydrination of allyl alcohol the optimum range of hydrochloric acid concentration may be between about 0.1 and 5 normal, and preferably between a 1 and 3 normal concentration. It may be generally stated that the use of higher concentrations of the hydrogen halide favors the formation of dichlorhydrins. In other words, with an increase in the concentration of the hydrochloric acid, the ratio of monochlorhydrins to dichlorhydrins decreases. On the other hand, when excessively low acid concentrations are employed there is a tendency toward side-reactions. For instance, with a decrease in the concentration of the hydrogen halide such as hydrochloric acid, the formation of chloric acid was observed. Also, the electric current efficiency decreases with a decrease in the hydrogen halide concentration. Furthermore, the chlorate ions which are formed at the anodes as the result of side-reactions when comparatively low acid concentrations are employed, are partly destroyed by being reduced at the cathodes. This also causes relatively high current losses.

Although the concentration of the unsaturated aliphatic and/or alicyclic alcohols in the electrolyte may also vary within relatively wide limits, it has been unexpectedly discovered that both the conversion rate to the corresponding halohydrins as well as the electric current efficiency increase with a decrease in the alcohol concentration. In fact, the best results, at least so far as the chlorhydrination of allyl alcohol is concerned, were obtained when the concentration of the alcohol was maintained at from about 0.01% to about 0.5% and preferably below about 0.05% by weight of the electroylte. Obviously, the present process may be effected with higher alcohol concentrations. However, at these higher alcohol concentrations a different electrochemical process apparently begins to take place. For example, when the allyl alcohol concentration is between about 5% and 10% by weight, the current efficiency becomes quite low, and acrolein can be readily detected among the reaction products. Therefore, it is believed that increased concentrations of the unsaturated alcohol favors its oxidation. In practice, in order to obtain best yields of halohydrins, while maintaining relatively high current efficiencies, it is therefore advantageous to maintain a very low alcohol concentration in the aqueous solution, and to continuously or intermittently add further quantities of the alcohol at a rate commensurate with its consumption or conversion to the halohydrin.

The current density at the cathode or cathodes may vary within relatively wide limits without any apparent effect on the yield of the desired halohydrins. For instance, cathodic current densities in the range of from about 10 to 50 amperes per dm.$^2$ of the cathode surface, even at temperatures of about 50° C. did not appear to have any influence on the halohydrination of allyl alcohol according to the process of the present invention. On the other hand, the anodic current density appears to have at least some effect on the yield of the desired product as well as on the electric current efficiency. Thus, it was found that excessively high current densities at the anode lower the electric current efficiency and the yield of the halohydrins. The optimum range of such anodic current densities will vary depending on a number of different operating conditions, such as the unsaturated alcohol to be treated, concentrations employed, operating temperature, etc. Generally, it may be stated that the use of anodic densities between about 2 and 25 amperes per dm.$^2$ of anodic surface, and preferably in the neighborhood of from 5 to 10 amperes per dm.$^2$ of anodic surface, produces excellent results during chlorhydrination of allyl alcohol. However, somewhat lower and higher densities may be used without materially affecting the yield of chlorhydrins or the electric current efficiency.

The term "current efficiency" or "electric current efficiency" as employed herein denotes the ratio of the number of mols of substance transformed to the amount of electricity employed therefor. For example, the alcohol current efficiency of a given halohydrination operation would thus be the ratio of the number of mols of the unsaturated alcohol used up in the cell divided by the amount of electricity actually employed or consumed. Since in the halohydrination of unsaturated alcohols according to the present process, two faradays of electricity are used to form one mol of halohydrin, only one-half of the electricity actually employed is considered in calculating the aforementioned current efficiency.

The following examples will serve to illustrate the process of the present invention, it being understood that there is no intention of being limited by any details of operation, such as temperature, concentrations of the starting-materials and of final products, current densities, etc., the inventions being co-extensive in scope with the appended claims.

*Example I*

A cell was provided with six anodes and one cathode made of graphite, these electrodes being immersed in an electrolyte consisting of about 8,000 cc. of a normal aqueous hydrochloric acid solution. An electric current of 125 amperes was passed at about 5.7 volts through this solution and between the graphite electrodes. The current density was about 10.4 amperes per dm.$^2$ of anode surface, and about 30.3 amperes per dm.$^2$ of cathode surface. Allyl alcohol was introduced into the cell at a rate at which it was expected to be consumed and converted to chlorhydrins, this introduction being effected intermittently and in such amounts that the allyl alcohol concentration in the electrolyte at no time exceeded about 0.2% by weight. Concentrated hydrochloric acid was also added at substantially the same rate so as to maintain the aforementioned in concentration thereof. The reaction was continued for a period of about nine (9) hours, during which time about 20.51 mols of allyl alcohol were introduced, the total quantity of hydrochloric acid applied being equal to about 33.4 mols. A total of 41.9 faradays of electricity was passed through the solution. The reaction temperature was maintained at about 30° C. An analysis of the resulting solution showed that it contained predominantly glycerol mono and dichlorhydrins. The above figures indicate that the alcohol current efficiency was 97.7%.

In order to determine the amount of allyl alcohol converted to the chlorhydrins, the reaction mixture from the above electrochemical chlorhydrination was first neutralized to a pH of about 7 and then subjected to hydrolysis with dilute sodium carbonate, this reaction being effected in a steel autoclave heated to about 160° C. for a period of about 45 minutes during which time the pressure rose to about 200 lbs. per square inch. The hydrolysate was concentrated, while still in an alkaline state, this concentration being effected under a partial vacuum until a relatively strong glycerin solution was obtained while most of the salts had precipitated out. The remaining salt was then extracted with isopropyl alcohol. The following table shows the yield of glycerin, as well as a total material balance present both as percent and as mols of allyl alcohol accounted for:

|  | Mols | Percent |
| --- | --- | --- |
| Crude glycerin | 18.20 | 88.8 |
| Glycol | 0.10 | 0.5 |
| Bottoms (calculated as diglycerol) | 1.01 | 4.9 |
| Loss in salts | 0.12 | 0.6 |
| Gaseous products | 0.22 | 1.1 |
| Unaccounted losses | 0.86 | 4.1 |
|  | 20.51 | 100.0 |

From the above figures, it is seen that 88.8% of the allyl alcohol employed was recovered as crude glycerin. The glycerin current efficiency was therefore 86.9%.

*Example II*

This experiment was conducted in the same chlorhydrination cell as the test described above. The operating conditions were also substantially the same. However, a 2 normal hydrochloric acid solution was employed, and the temperature of the electrolyte was not allowed to rise above about 22° C. The current anodic and cathodic current densities were 10.1 and 30.3 amperes per $dm.^2$ of electrode surface respectively. As in Example I, an electric current of 125 amperes was passed through the solution at about 4.6 volts for a period of about 13 hours, during which time a total of 28.55 mols of allyl alcohol were introduced from time to time into the solution at such a rate that the concentration of the alcohol never exceeded about 0.2%. During the same period of time, concentrated hydrochloric acid was also introduced to maintain its concentration at about a normality of two. In this manner, a total of about 68 mols of hydrochloric acid were applied. The total current consumption was 60.7 faradays. The electric current efficiency, based on the allyl alcohol applied, was thus equal to about 94%, although in other experiments under identical conditions this alcohol current efficiency usually rose to about 97% to 98%.

The aqueous solution obtained at the end of the above electrochemical chlorhydrination after neutralization of the excess acid was then hydrolyzed and treated in the same manner as described in connection with the recovery of glycerin in Example I. The following is the material balance obtained from this hydrolysis step, this being calculated on the applied allyl alcohol:

|  | Mols | Percent |
| --- | --- | --- |
| Crude glycerin | 24.4 | 85.6 |
| Bottoms (calculated as diglycerol) | 3.05 | 10.7 |
| Loss in salts | 0.31 | 1.1 |
| Gaseous products | 0.17 | 0.6 |
| Unaccounted losses | 0.62 | 2.0 |
|  | 28.55 | 100.0 |

The electrochemical chlorhydrination of allyl alcohol under the above conditions thus gave a 85.6% conversion to glycerin, the glycerin current efficiency thus being equal to 80.5%.

A comparison of the results obtained in the above described tests shows that better yields of monochlorhydrins were obtained when the chlorhydrination was effected in weaker acid solutions. On the other hand, probably due to the somewhat lower conductivity, the voltage and the thermal losses of electric current were somewhat higher when weaker hydrogen halide solutions were employed.

*Example III*

In order to show the effect of concentration of the unsaturated alcohol during electrolysis in accordance with the process of the present invention, two tests were made in both of which the cell contained 1000 cc. of a 1 normal hydrochloric acid. The electrodes were of platinum. In the first test a mol of allyl alcohol was added to the electrolyte at the start of the operations, while in the second test the alcohol was added continuously until 1 mol thereof was thus used up, the average allyl alcohol concentration in this case being maintained in the neighborhood of 0.007 mol per liter. An analysis of the resultant solutions from both tests showed that, whereas only about 35.1% of the allyl alcohol was converted to chlorhydrins in the case where the alcohol was added at the start of the operations, the continuous maintenance of the low allyl alcohol concentration caused or permitted the conversion of about 73.2% of the alcohol to the chlorhydrins.

Aside from the fact that the present process obviates the necessity of separation and handling of the halogen normally required for the preparation of halohydrins according to the purely chemical processes known and used until the present time, the electrochemical halohydrination of unsaturated alcohols according to this invention is also advantageous in that it allows the preparation of halogenated organic hydroxy compounds in considerably stronger solutions or concentrations than heretofore attainable. This, obviously, facilitates the recovery of the products in a pure state by decreasing the quantity or volume of solutions to be treated to obtain a given quantity of the desired halohydrin. Although the current efficiency drops somewhat when the halohydrin concentrations in the electrolyte become very high, it was experimentally determined that concentrations of about 20% or more are attainable without any influence or effect on the current efficiency and, therefore, the economy of the process. For instance, with an anodic current density of 10.1 amperes per $dm.^2$, the alcohol current efficiencies were 92.3% and 94.0% when the final chlorhydrin concentrations in the electrolyte were 10% and 20% by weight, respectively. At higher concentrations, a small decrease in the current efficiency was noted. However, in some cases it may be advantageous to sacrifice the electric current efficiency in order to obtain higher halohydrin concentrations.

Although the invention has been described with particular reference to the electrochemical chlorhydrination of allyl alcohol, it is to be understood that the present process is equally applicable for the conversion of other unsaturated aliphatic and/or alicyclic alcohols to the corresponding halohydrins. Also, besides hydrochloric acid, it is possible to use other aqueous hydrogen halide solutions, such as an aqueous hydrobromic acid.

The reaction temperatures used in the above described examples ranged between about 20° C. and 30° C. However, higher and lower temperatures may also be used without any substantial effect on the halohydrination reaction. Also, although the reactions were all effected at atmospheric pressures, it is possible to operate at elevated and even reduced pressures.

We claim as our invention:

1. A process for the production of glycerol chlorhydrins which comprises forming an aqueous solution of hydrogen chloride and allyl alcohol in a simple cell provided with an anode and a cathode, maintaining the hydrogen chloride concentration between about 1 and 3 normal and the allyl alcohol concentration between about 0.01% and about 0.05% by weight, subjecting said solution to the action of a direct electric current of a density equal to between about 5 and 10 amperes per square decimeter of anodic surface, and maintaining the allyl alcohol and hydrogen chloride concentrations by addition of fresh quantities thereof as the same are utilized.

2. A process for the production of glycerol chlorhydrins which comprises forming an aqueous solution containing hydrogen chloride and allyl alcohol, the allyl alcohol being present in a concentration of between about 0.01% and about 0.5% by weight of the solution, and subjecting said solution to the action of a direct electric current transmitted through said solution between an anode and a cathode disposed therein.

3. In a process for the production of glycerol halohydrins, the steps of forming an aqueous solution containing a hydrogen halide and allyl alcohol, the allyl alcohol being present in a concentration of between about 0.01% and about 0.5% by weight of the solution, and subjecting said solution to the action of a direct electric current transmitted through said solution between an anode and a cathode disposed therein.

4. A process for the production of glycerol halohydrins which comprises subjecting an aqueous solution containing a hydrogen halide and allyl alcohol to the action of a direct electric current in a simple cell provided with an anode and a cathode, the allyl alcohol being present in the aqueous solution in a concentration between about 0.01% and about 10% by weight.

5. A process for the production of halohydrins which comprises forming an aqueous solution containing a hydrogen halide in a concentration of between about 0.1 and 5 normal, introducing an unsaturated aliphatic alcohol into said solution in a quantity of between about 0.01% and 0.5% by weight thereof and subjecting the mixture thus formed to the action of a direct electric current transmitted through said mixture between at least one cathode and at least one anode disposed in said aqueous mixture.

6. The process according to claim 5, wherein the electric current transmitted through the aqueous mixture is of a density equal to between about 2 and 25 amperes per square decimeter of anodic surface employed.

7. In a process for the production of halohydrins the steps of forming an aqueous solution containing a hydrogen halide and an unsaturated aliphatic alcohol, the unsaturated alcohol being present in a concentration of between about 0.01% and about 0.5% by weight of the solution, and subjecting said solution to the action of a direct electric current transmitted through said solution between an anode and a cathode disposed therein.

8. In a process for the production of halogenated organic hydroxy compounds, the steps of forming a mixture containing an aqueous solution of a hydrogen halide and an unsaturated alcohol, the unsaturated alcohol being present in a concentration of between about 0.01% and 0.05% by weight of the solution, and subjecting said mixture to the action of a direct electric current transmitted through said solution between an anode and a cathode disposed in said solution.

9. In a process for the production of halogenated organic hydroxy compounds, the steps of forming a mixture containing an aqueous solution of a hydrogen halide and an unsaturated alcohol, the unsaturated alcohol being present in a concentration of between about 0.01% and about 0.5% by weight of the solution, and subjecting said mixture to the action of a direct electric current transmitted through said solution between an anode and a cathode disposed therein.

10. In a process for the production of halogenated organic hydroxy compounds, the step of subjecting a mixture of an unsaturated alcohol and of an aqueous hydrogen halide solution to the action of an electric current, the unsaturated alcohol being present in the aqueous mixture in a concentration between about 0.01% and about 10% by weight.

MIROSLAV TAMELE.
LLOYD B. RYLAND.